(12) United States Patent
Beier

(10) Patent No.: US 7,413,587 B2
(45) Date of Patent: Aug. 19, 2008

(54) DISPOSABLE FILTER FOR A FLUID HANDLING DEVICE AND A METHOD FOR USING THE SAME

(76) Inventor: Scott B. Beier, 915 N. 43rd Ave., Omaha, NE (US) 68131

( * ) Notice: Subject to any disclaimer, the term of this patent is extended or adjusted under 35 U.S.C. 154(b) by 138 days.

(21) Appl. No.: 11/475,608

(22) Filed: Jun. 27, 2006

(65) Prior Publication Data

US 2006/0236856 A1 Oct. 26, 2006

Related U.S. Application Data

(62) Division of application No. 10/779,887, filed on Feb. 17, 2004.

(51) Int. Cl.
*B01D 29/56* (2006.01)
(52) U.S. Cl. .............................. 55/483; 55/484; 55/485; 55/486; 55/DIG. 12; 95/286; 210/314; 210/493.3; 210/495; 210/767
(58) Field of Classification Search ........... 55/483–486, 55/DIG. 12; 95/286; 210/314, 493.3, 495, 210/767
See application file for complete search history.

(56) References Cited

U.S. PATENT DOCUMENTS

| 6,648,947 | B2 * | 11/2003 | Paydar et al. | .................. 95/278 |
| 6,797,041 | B2 * | 9/2004 | Brownell et al. | .............. 95/268 |
| 7,008,468 | B2 * | 3/2006 | Ashe | ........................... 95/286 |

* cited by examiner

*Primary Examiner*—Minh-Chau T. Pham
(74) *Attorney, Agent, or Firm*—Dennis L. Thomte; Thomte Law Office LLC

(57) ABSTRACT

A fluid handling device having a support frame and a plurality of filter frames attached thereto. Each of the filter frames has an outer frame member that removably secures a filter; the filters being either a planar filter, pocket filter, or multiple pocket filter. The various filters can be arranged to correlate the change-out schedule of all of the filters across the fluid flow area. The filters with the highest particulate capacity can be arranged to be in the zone of the fluid flow area with the highest particulate concentration. The filters are easily constructed from a single piece of filtration media and collapsible to save space when storing or shipping.

9 Claims, 7 Drawing Sheets

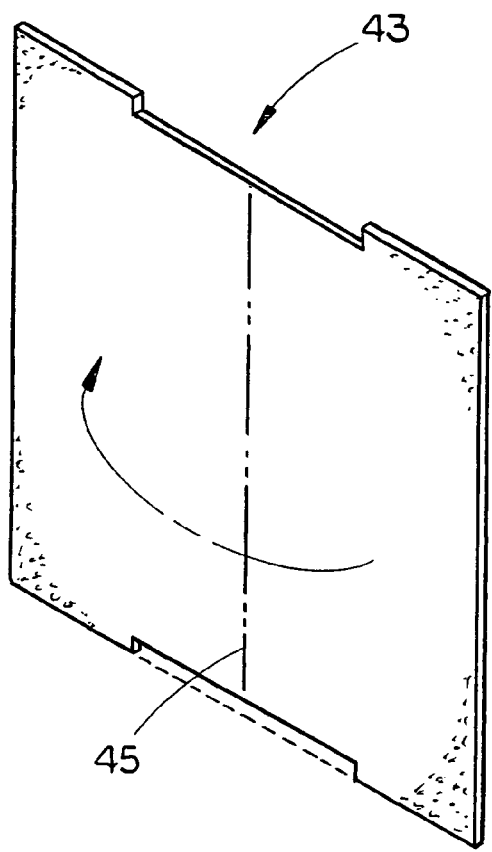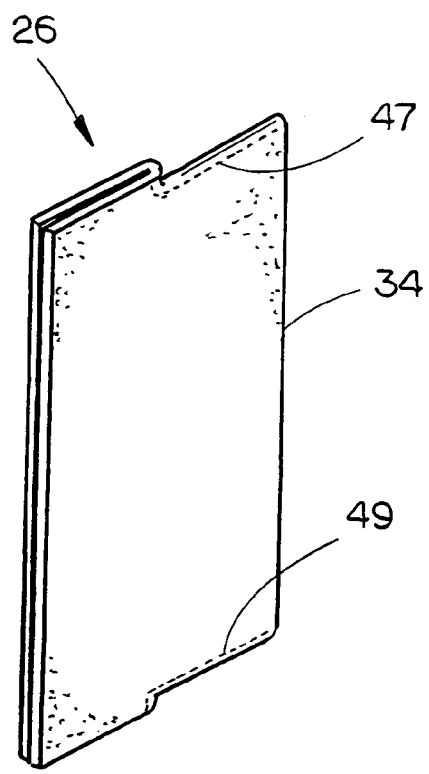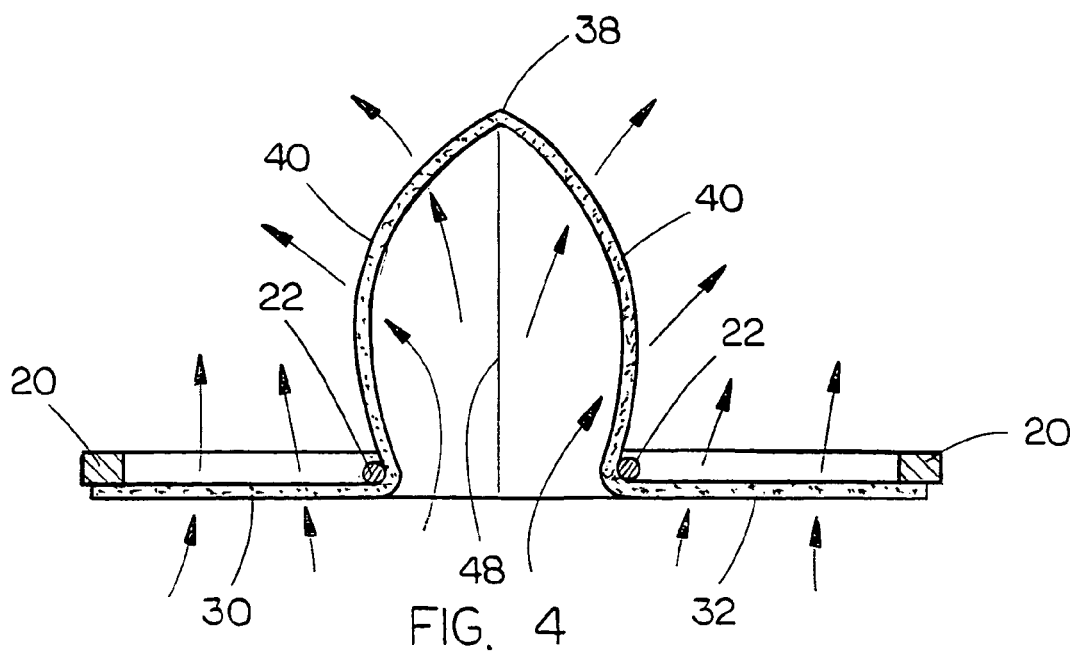

DISPOSABLE FILTER FOR A FLUID HANDLING DEVICE AND A METHOD FOR USING THE SAME

CROSS-REFERENCE TO RELATED APPLICATION

This is a divisional application of Petitioner's earlier application Ser. No. 10/779,887 filed Feb. 17, 2004, entitled "DISPOSABLE FILTER FOR A FLUID HANDLING DEVICE AND A METHOD FOR USING THE SAME".

BACKGROUND OF THE INVENTION

1. Field of the Invention

This invention relates generally to disposable filters for fluid streams, and more particularly to extended surface area filters or pocket filters. The invention further relates to a pocket filter having a reusable frame and replaceable filtration media. The invention additionally relates to a pocket filter that is easily constructed from a single piece of filtration media. Moreover, this invention relates to a method of using the pocket filters of this invention in combination with planar filters to: (a) control the air flow or holding capacity over the fluid flow area of the fluid handling device; and (b) adjust the type and variety of filters which extend across the fluid flow area to control the change-out schedule of the individual filters. The filters of this invention and the described method of use may be used in association with a spray paint booth, a heating system, a ventilating system, an air handling system, an air conditioning system, or any other area which needs filtration.

2. Description of the Related Art

Many materials and combinations of materials have been used as filtration media to remove solid or liquid particulate from fluid (i.e. liquid or gaseous) streams. The capabilities of such filter media are judged according to three main criteria: (1) the particulate removal efficiency (i.e. the ability of the filter media to capture and retain particulate); (2) the pressure drop for a given flow rate of fluid through the media (which is utilized as a measure of the power required to move the fluid stream through the media); and (3) the holding capacity or the total amount of particulate which can be retained by the media before the pressure drop becomes so great that the media must be cleaned or replaced.

One solution to improving the performance of a filter system known commonly in the prior art is to arrange filter media into extended surface area configurations commonly known as pocket filters. By increasing the amount of filter media presented to a given fluid stream, the fluid flow through a unit area of the media is reduced, consequently lowering the total pressure drop through the filter arrangement (i.e., lowering the power required to move the fluid stream). Furthermore, by using an extended surface area configuration to increase the area of filter media present to a given flow area, greater amounts of particulate can be accumulated before the resultant pressure drop increase requires the filter media to be cleaned or replaced. Moreover, it is known in the prior art that the greater the number of pockets in a pocket filter, the greater the effect because more filter media is possible with more pockets. These capability improvements are achieved for any given filter media and as such the particulate removal efficiency remains relatively unchanged in a pocket filter as compared to the same filter media used in a flat or planar filter. Consequently, for a given filter media, the use of a pocket filter can create a filter system with nearly the same efficiency as a planar filter yet, as a system, requires less power for the movement of the fluid stream, and has a longer life.

It is also known in the prior art that, generally speaking, more efficient filter medias have higher per unit pressure drops. Therefore, by arranging more efficient filter medias in extended surface area configurations yields filters having increased efficiencies with no more pressure drop than their lesser efficiency planar filter counterparts.

In order to achieve the advantages of a pocket filter, filter media must be arranged, supported, retained and sealed in place by frames and/or other structural systems. In the prior art, such structural systems include: (1) wire frames around which the edges of the pocket filter media are wrapped and then sewn, glued, heat sealed, stapled or otherwise permanently attached to the frame; and (2) metal or plastic channel-type frames that clamp or otherwise mechanically attach around the edges of the media pockets to form a pocket filter assembly. In the prior art, much effort has been put to improving the structural systems for extended surface area filters. One such improvement is shown in U.S. Pat. No. 4,300,927 which describes a frame for a pocket filter. Another such improvement in pocket filter frames is shown in U.S. Pat. No. 4,325,718. Yet another improvement for pocket filter frames is disclosed in U.S. Pat. No. 5,298,044.

Further, prior art pocket filters have been constructed with a single V-shaped pocket, multiple V-shaped pockets, or cube shaped pockets. In those cases, the filter media is permanently attached to the frame around the perimeter of the filter entrance plane with the pocket or pockets hanging from the frame on the downstream side of the frame. In the case of multiple V-shaped pocket filters, the filter media pockets are also supported in the filter entrance plane by an interior portion of the frame located at the peaks between adjacent pockets. In all prior art pocket filters known to the inventor, the filter media tapers away from the frame components such that all parts of the media are directly exposed to the straight-line fluid flow.

The prior art described above demonstrates the current state of the art of extended surface area pocket filters and the complexity and cost associated with the products. The cost of these items is of particular interest when the prior art pocket filters are designed to be disposable (i.e., non-cleanable) because the frame is an integral part of the filter assembly and must be disposed of with, and when, the dirty media is disposed, thereby increasing the cost of each replacement filter unit. Disposal is further complicated and costly in that the frames are generally of a different material than the filter media (e.g., metal frames vs. fibrous medias). Solid waste disposal (verses incineration for example) is generally the only option available when multiple materials are present.

Another problem with the prior art filters is that the frame is permanently attached to the filter media at the factory meaning that the frame dictates shipping size and shipping cost. Larger filter units become cost prohibitive in shipping size due to the large frame size. Frame dimensions are generally limited to smaller parcel package sizes. Typically these frame dimensions are found to be 20"×20", 24"×24" and occasionally, 24"×48". As can be appreciated, the complexity and cost to manufacture many smaller pocket filters is greater than the cost to manufacture fewer larger pocket filters. A further consequence of the smaller filter unit sizes is the greater time and therefore the greater cost associated with the change-out of many smaller pocket filters (as required by the increased pressure drop resulting from the accumulation of captured particulate) in a large filter bank as compared to fewer larger pocket filters. As an example, the filter bank in a typical spray booth measuring ten feet high by twenty feet wide would require fifty 24"×24" pocket filter units to be changed. Furthermore, by comparison, the same ten foot high by twenty foot wide spray booth would easily require ten or less pocket filters of the current invention. It must also be understood that for the pocket filters to perform the required function of filtering particulate from the fluid stream the pocket filters must be properly installed in the filter bank. It is certainly easier and therefore more dependable to install fewer larger pocket filters than it is to install a greater number of smaller pocket filters.

It is a further problem with prior art disposable pocket filters that in order to keep costs down, the strength and durability of the frame must be minimized. It is very common in the prior art that, unless carefully handled, the frames within a disposable pocket filter will be damaged or deformed during shipping and installation. If such damage occurs, the functionality and the dependability of the pocket filter are compromised.

SUMMARY OF THE INVENTION

In this invention, an improved filter system and method for using the same is disclosed. The filter system of the present invention is used for filtering particulate material from a generally unidirectional fluid stream. The filter system has a support frame and one or more filter frames mounted to a fluid handling device such as a furnace or paint booth. The filter frames are generally comprised of a plurality of outer frame members. Additionally, when the filter frame is used with a pocket filter, one or more inner frame members may also be necessary. The filter frames may be used to maintain a variety of filters. Preferably, the filter frame maintains a planar filter, a pocket filter, or a multiple pocket filter. The various filters may be interchanged to vary the particulate holding capacity and/or pressure drop across the fluid flow area of the fluid handling device.

Pocket filters, multiple pocket filters and planar filters may be selectively used over the fluid flow area to yield zones of variable flow rates over the entire fluid flow area. Varying the type of filter also creates different holding capacities in the various zones. The user can then engineer the overall holding capacity of the fluid handling device to provide a desired filter change-out schedule. Also, the user can engineer the change-out schedule so that each filter is near capacity when any one filter requires replacement.

Although the media assembly of the pocket filter or multiple pocket filter used in this invention may be of more traditional designs, the preferred pocket filter and multiple pocket filter of the present invention are of simplified construction. The filters are constructed from a single piece of filtration media. When being stored or shipped, the filters may be collapsed to save space. When the filters are needed, the filters are easily unfolded and expanded for filtration purposes.

One of the principal objects of the invention is to eliminate the need and cost of integral frames in replacement pocket filter assemblies.

Another object of the invention is that the frames of the filter be constructed in a durable manner.

Yet another object of the invention is to provide a filter frame that eliminates the risk of deformation or damage to the filter frame and provides for a more dependable installation of the filter.

Still another object of the invention is to provide a filter that is easily collapsed and conveniently shipped.

Yet another object of the invention is to provide a filter system where larger filter assemblies are easily manufactured, cost effective, and economic to ship.

Still another object of the invention is to provide a method of using the filter system that is efficient and cost effective.

Yet another object of the invention is to provide a method of using the filter system where all the filters are uniformly loaded at the time for replacing the filters.

Yet another object of the invention is to provide an economic method of using the filter system where the various filters of the fluid handling device all require changing during a predetermined replacement period.

Still another object of the invention is to provide a pocket filter that is constructed from a single piece of filtration media.

Yet another object of the invention is to provide a pocket filter that is movable between a collapsed and a filter position.

These and other objects will be apparent to those skilled in the art.

BRIEF DESCRIPTION OF THE DRAWINGS

FIG. 2 is a perspective view of the raw filtration media before it has been assembled into a pocket filter;

FIG. 3 is a perspective view of a collapsed pocket filter after it has been assembled from the raw media;

FIG. 4 is a sectional view of the pocket filter during use;

DETAILED DESCRIPTION OF THE INVENTION

Figure 1:
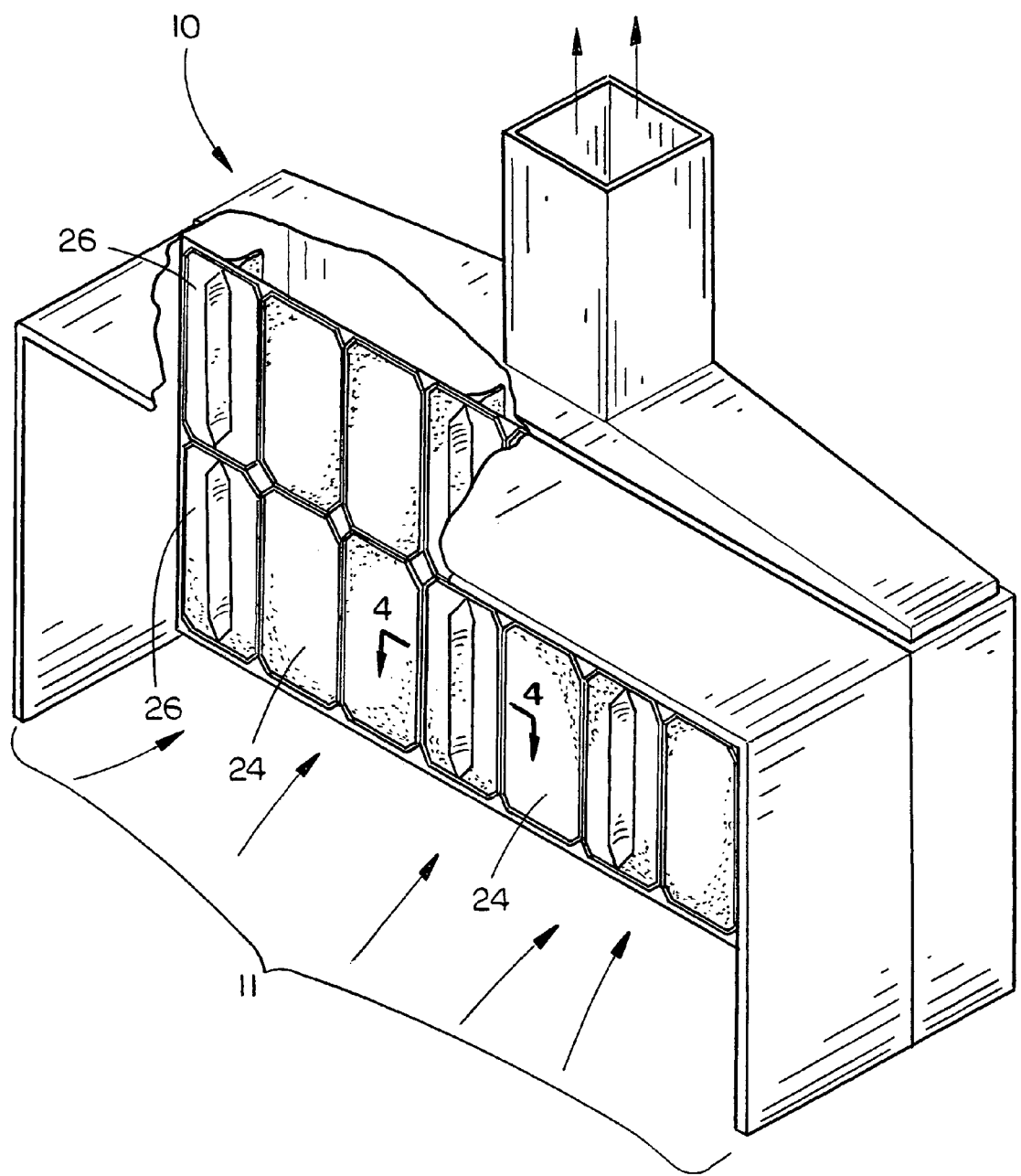
FIG. 1 is a perspective view of the fluid handling device with various types of filters installed across the fluid flow area.

In the drawings, a fluid handling device is referred to by the reference numeral 10. The numeral 10 may be any type of a fluid handling device known in the art such as a spray paint booth, a heating system, a ventilating system, an air handling system, or an air conditioning system. The fluid handling device 10 is adapted to filter a fluid (i.e. liquid or gaseous streams) through a filtration media over the fluid flow area 11 of the fluid handling device 10. As shown in FIG. 1, a pressure differential is created across the filtration media in order to draw fluid through the filtration media.

A support frame 12 extends around the perimeter of the fluid flow area 11. The support frame 12 may be a portion of the fluid handling device 10 or a separately installed frame member secured to the fluid handling device 10 in the usual manner. In the situation where the filter frames 14 are mounted directly to the fluid handling device 10, the support frame 12 is not necessary. However, in the preferred embodiment, a plurality of filter frames 14 is selectively removably mounted to the support frame 12. Even though the drawings depict multiple filter frames 14 secured to the support frame 12, it is contemplated that a single filter frame could be utilized. The filter frames 14 are easily removable from one another and the support frame 12 so that the may be easily installed and replaced. Also, the filter frames 14 are durable and in some situations may be permanently fixed to the fluid handling device 10.

Figure 5:
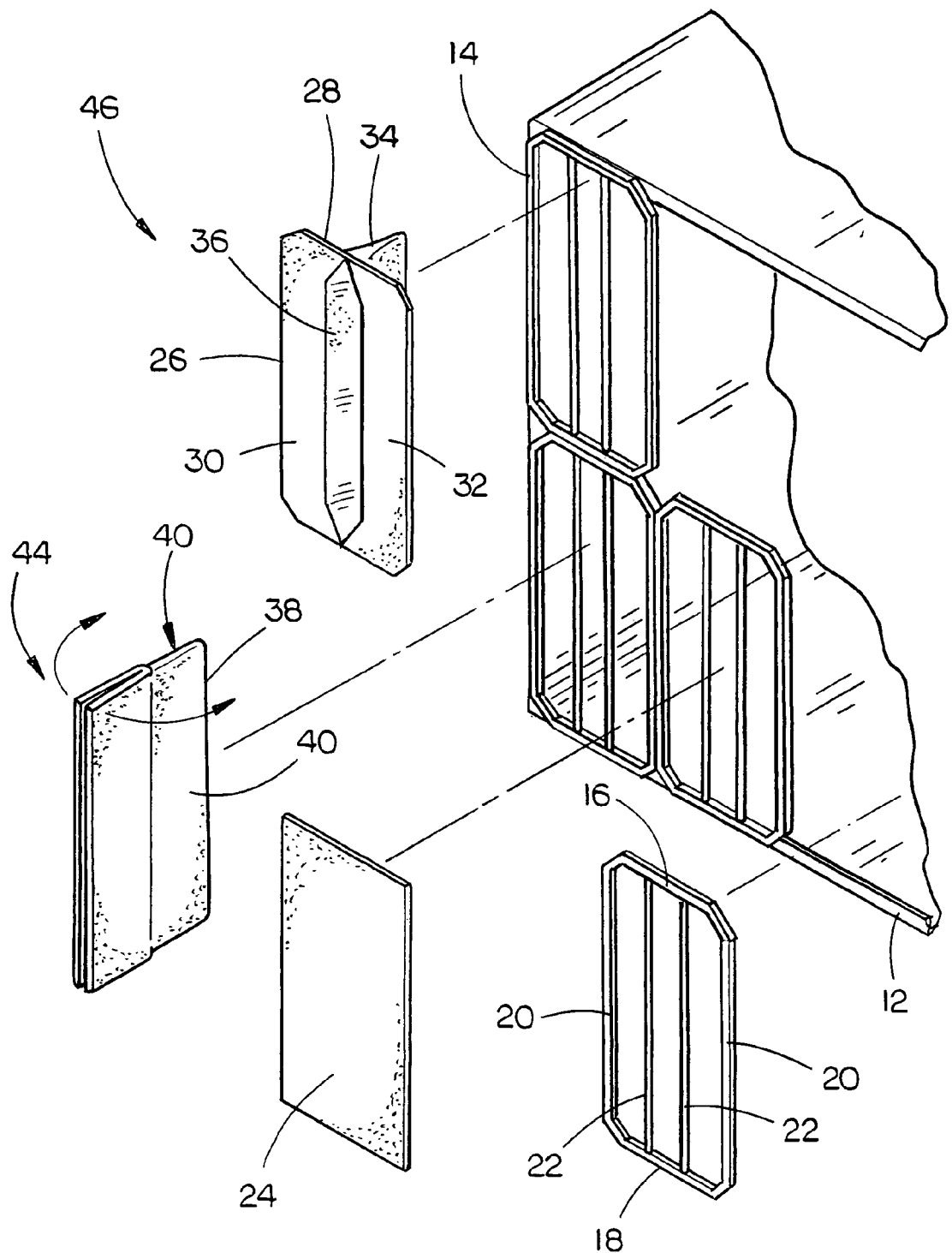
FIG. 5 is an exploded view of a portion of the fluid handling device of FIG. 1.
Figure 6:
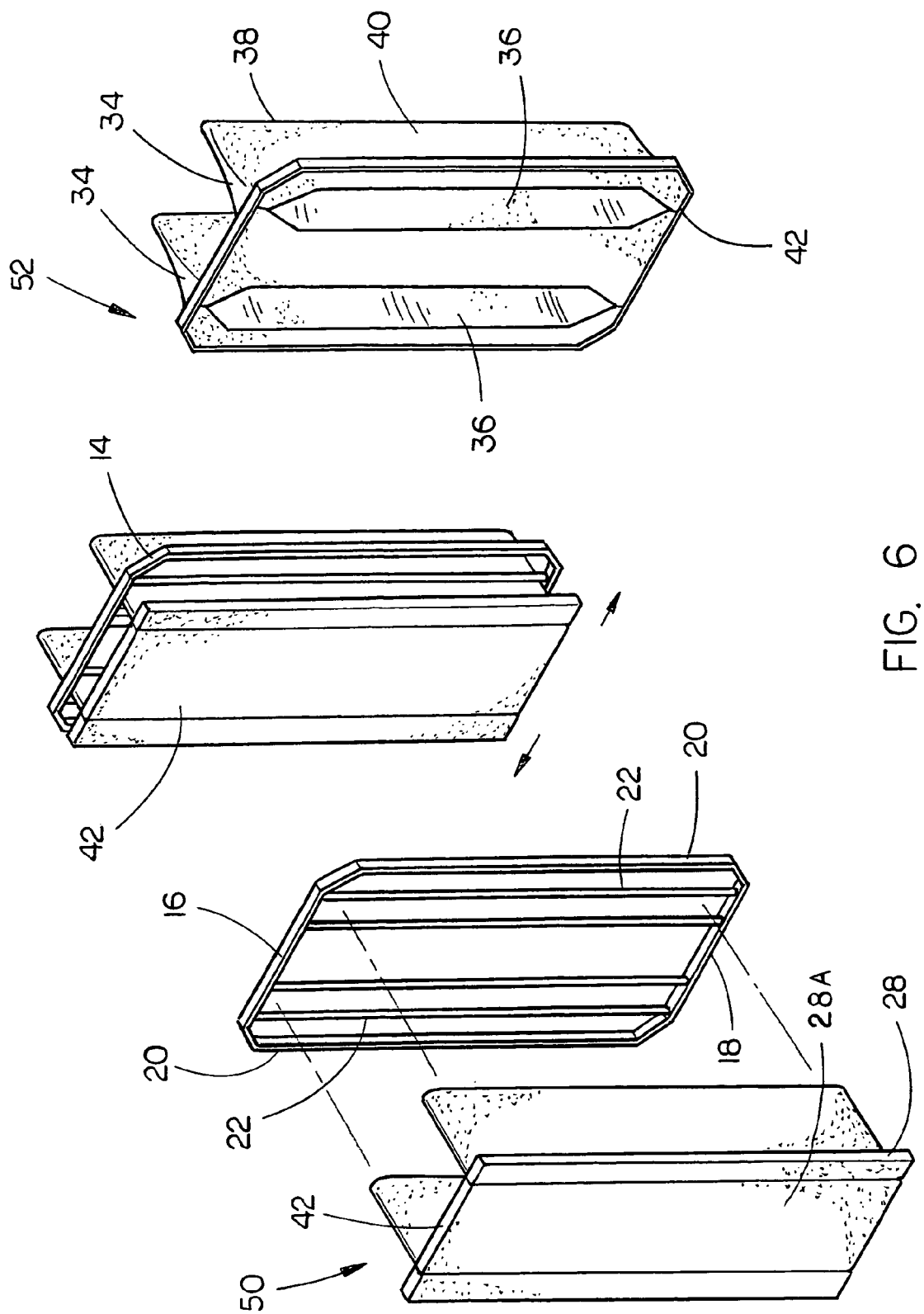
FIG. 6 is an exploded perspective view of the multiple pocket filter in its partially collapsed and filter positions.

Even though the drawings depict the filter frame 14 as generally rectangular-shaped, the shape of the filter frame 14 is not essential to the present invention. Filter frame 14 may be circular, triangular, square or any other shape sufficient to maintain a filter as more fully described below. Any shaped frame that can maintain a filter between the members of the frame is adequate. In the preferred embodiment, the filters are generally rectangular-shaped. As shown in FIGS. 5 and 6, the rectangular-shaped filter frame 14 has a plurality of outer frame members. The filter frame 14 has horizontally disposed upper and lower members 16 and 18, respectively. The filter frame 14 also has vertically disposed side members 20. Although the drawings illustrate the frames and filters in a "vertical" orientation, the frames and filters could be "horizontally" oriented if so desired.

Depending on the shape of the filter, the filter frame 14 may work adequately with only the upper 16, lower 18 and side frame members 20. In some situations, the filter frame 14 may also include inner frame members 22. The number of inner frame members 22 depends on the type of filter used, as more fully set forth below. For example, if a more traditionally structured two pocket filter media assembly is used, a single inner frame member 22 would be used to support the peak between the two pockets. As another example, in the situation where the single pocket filter of the present invention is used, two inner frame members 22 might be used to support the pocket portion of the filter. As another example, where a multiple pocket filter is used, four or more inner frame members 22 might be used to support several pockets. Again, regardless of the type of filter used, the inner frame members 22 are not necessary to the present invention. Also, even though the drawings depict the inner frame members 22 as being vertically disposed, they could be horizontally disposed or the inner frame members 22 may be circular, triangular, square or any other shape which will help support a filter. For example, in the preferred embodiment, the inner frame members 22 form rectangular openings to help support the pocket portion of the filter. However, it is contemplated that the inner frame member 22 could be positioned to form a circular opening, triangular opening, square opening, or any other shaped opening that would help support the pocket portion of the filter.

The fluid handling device 10 may perform satisfactorily with several types of filters. However, in certain situations, it may be desirable to use a specific combination of filters. One of the filters of the present invention is a planar filter 24 depicted in FIG. 5. Another filter of the present invention is a pocket filter 26, as also depicted in FIG. 5. The pocket filter 26 has a base panel 28 with first and second end portions 30 and 32, respectively. The pocket filter 26 also has a pocket portion 34 with a pocket opening 36, a closed end 38 and side panels 40.

An alternative embodiment of the pocket filter 26 is shown in FIG. 6 as a multiple pocket filter 42. As shown, the multiple pocket filter has two pocket portions 34. Yet, it is contemplated that more than two pocket portions 34 may be utilized. The multiple pocket filter 42 also has a base panel 28 and an intermediate base portion 28a. The pocket portions 34 have pocket openings 36, closed ends 38 and opposite side panels 40.

The filters 26 and 42 are easily constructed from a single piece of filtration media. As depicted in FIG. 2, the filter 26 may be constructed from a single I-shaped piece of filtration media 43. The filtration media 43 is folded in half along centerline 45. The filtration media is then connected along lines 47 and 49 by sewing, gluing, stapling or any other conventional method known to connect filtration media.

As depicted in FIG. 5, the pocket filter 26 is movable between a collapsed position 44 and a filter position 46. When the pocket filter 26 is in its collapsed position 44, the first and second end portions 30 and 32 of the base panel 28 are positioned closely adjacent one another. Also, when the pocket filter 26 is in its collapsed position 44 the side panels 40 are positioned closely adjacent one another. The pocket filter 26 is in its filter position when the side panels 40 of the pocket portion 34 are spaced from one another to form a chamber 48, as depicted in FIG. 4.

Figure 7:
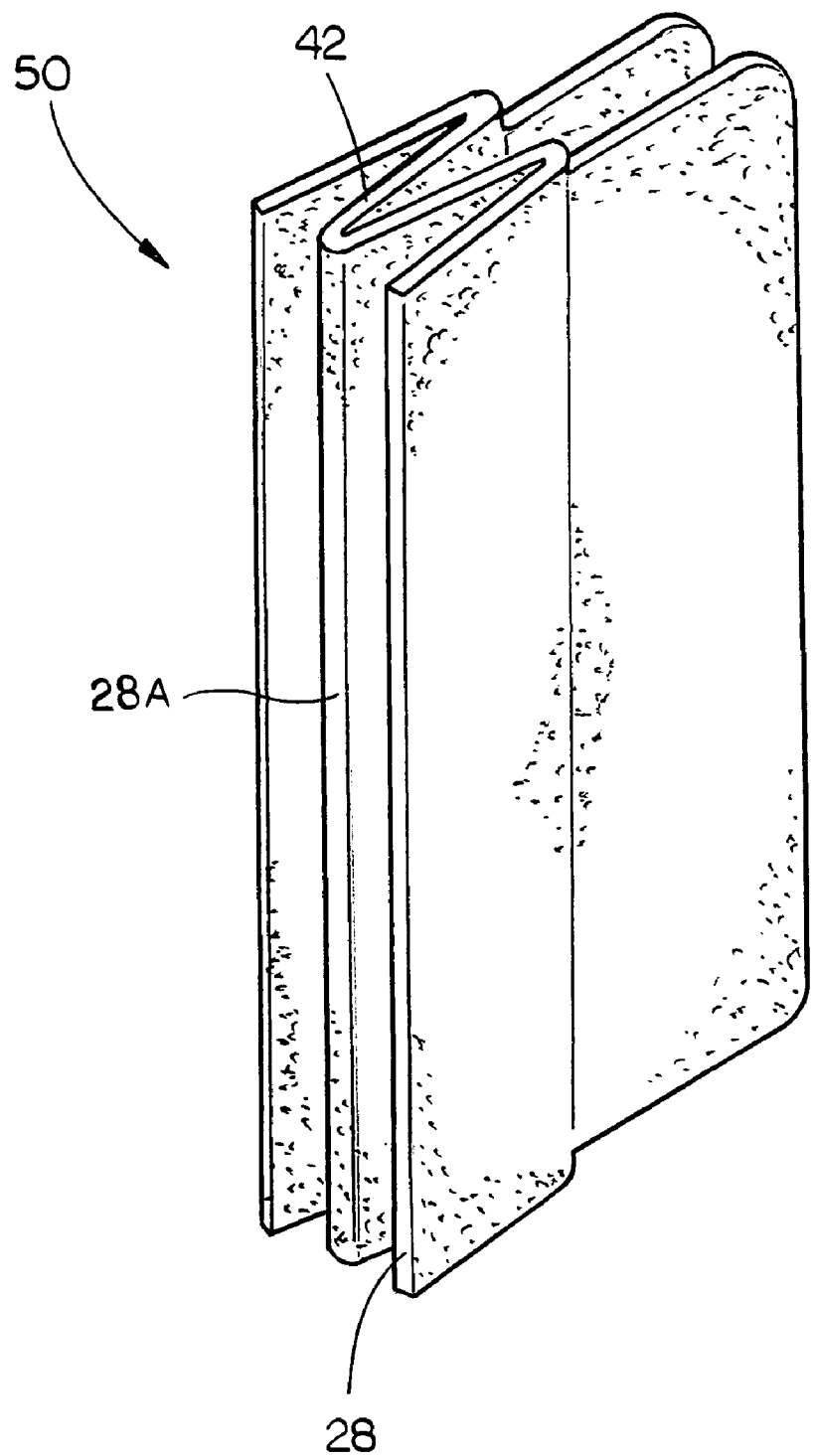
FIG. 7 is a perspective view of the filter 50 in its fully collapsed position.

In FIG. 6, the multiple pocket filter 42 is also movable from a collapsed position 50 to a filter position 52. As seen in FIG. 7, he multiple pocket filter 42 is in a collapsed position 50 when the first and second side panels 40 of each of the multiple pocket portions 34 are positioned adjacent one another, the intermediate base portion 28a is folded in half upon itself, and the first and second end portions of the base panel 28 are positioned closely adjacent the folded intermediate base portion 28a. The multiple pocket filter 42 is in a filter position 52 when the first and second said panels 40 of each of the pocket portions 34 are spaced from one another to form a chamber 48, as depicted in FIG. 4.

The collapsibility of the filters 26 and 42 makes storage and shipping of the filters economical. Also, the filter 26 and 42 are removable from the filter frame 14 and the filter and the filter frame 14 may be shipped or stored separately. Furthermore, filter frame 14 may be reused with new filters 26 and 42. As an example, a user may store the filter 26 in its collapsed position 44. In this position, the filter 26 uses little space, making the filter 26 efficient for storage or shipping. When a filter is needed, the user may expand the filter 26 as depicted by reference numeral 46. The user may then secure the filter 26 to the filter frame 14, as more fully described below. In the situation where the filter frame 14 also has one or more inner support members 22, the pocket portion 34 of the filter 26 may be positioned adjacent the inner supports 22 so that they help support the pocket portion 34. The filter frame 14 may then be mounted to the support frame or another filter frame, as depicted in FIG. 5. It is further possible that if the fluid handling device 10 is designed to allow access to the filter frames that the filter frames 14 may be permanently attached to the fluid handling device and the filters can be changed without removing the filter frames.

In many situations, the pocket portion 34 requires installation into a filter frame 14 having inner supports 22. These additional support members 22 are located to provide support to the pocket portion at the point where the pocket portion 34 transitions into the base panel 28. Support provided by the inner supports 22 and the differential pressure across the filter media of the filter 26 (or filter 42) causes the pocket portions 34 to inflate in much the same way as a balloon inflates. As shown in FIG. 4, this ballooning effect causes sections of the pocket portions 34 to be positioned behind the base panel 28. The result of this configuration is that sections of the pocket portion 34 are not in the straight line fluid flow of the particle-laden fluid stream. In most applications for the pocket filter 26, the particulate is heavier than the fluid stream. In such situations, the momentum of the particulate carries the particulate deeper into the pocket portion 34 of the pocket filter 26. Those sections of the pocket portion 34 that are out of the direct line of sight with the particulate-laden fluid stream are exposed to little or no particulate. Accordingly, those sections of the pocket portion remain open and the life and holding capacity of the pocket filter 26 is extended.

Figure 8:
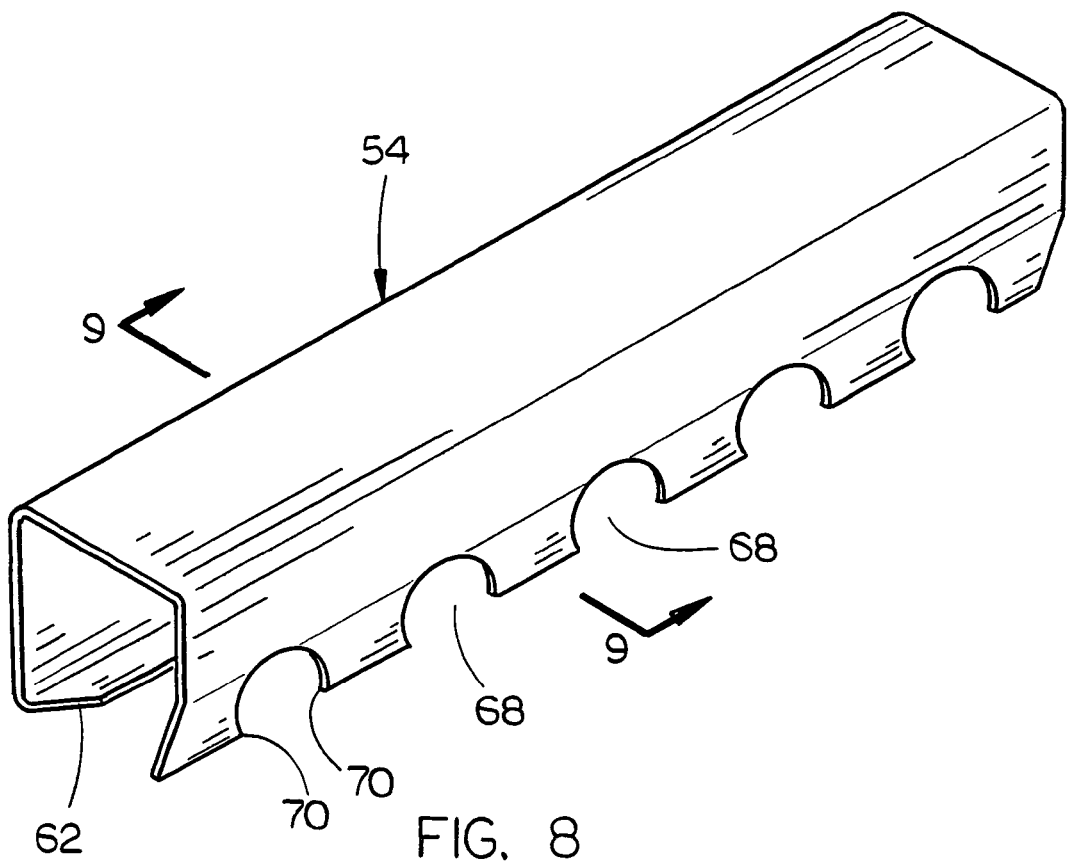
FIG. 8 is a partial perspective view of the filter frame member.
Figure 9:
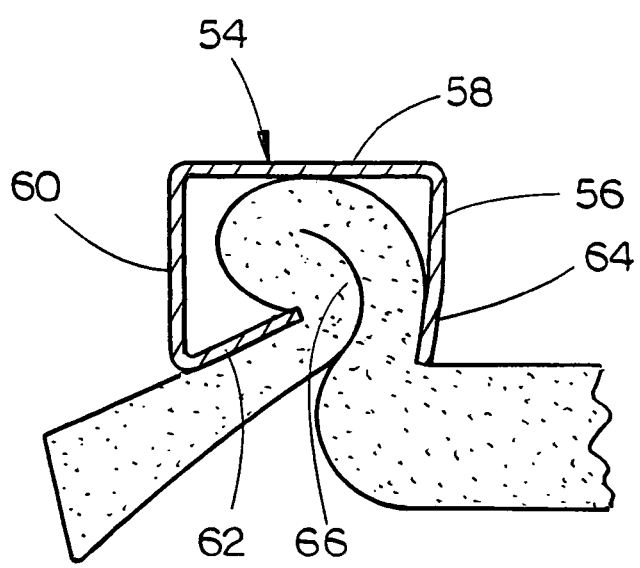
FIG. 9 is a sectional view illustrating the manner in which the filtration media is installed into the channel member of FIG. 7.

Even though the filters 26 and 42 may be secured to the filter frame 14 in any manner known to person of the skill in the art, the filter is preferably secured to the filter frame 14 as depicted in FIGS. 8 and 9. The frame 14 is described in U.S. Pat. No. 6,468,324. Channel member 54 includes a first wall 56, second wall 58, third wall 60, and fourth wall 62. Wall member 56 is preferably provided with an end portion 64 which is bent inwardly, as seen in FIG. 9. Wall member 62 preferably extends from wall member 60 at an acute angle with respect thereto and terminates inwardly of wall member 56 to define a space 66 between wall member 62 and end portion 64 of wall member 56. The free end of wall member 56 is provided with a plurality of voids 68 formed therein which create filtration media engagement points 70. Although it is preferred that the cut-outs or voids 68 are semi-circular in shape, as viewed in FIG. 8, the cut-outs 68 could be V-shaped, box-shaped, or any other shape as long as engagement points 70 are provided.

When it is desired to insert filtration media in the channel member 54, the media is folded upon itself at least at one end thereof, as illustrated in FIG. 9, and is pushed inwardly into or through the opening 66, as shown in FIG. 9. The engagement points 70 engage the filtration media as does the inner end of the wall member 62 so that the filtration media is securely held in the channel member 54.

In many situations, a user may desire installing one type of filter on the filter frame so that the types of filter are uniform across the fluid flow area. However, in other situations, varying the type of filter across the fluid flow area may produce beneficial results. Generally, a pocket filter will have a lower pressure drop and greater holding capacity than a planar filter comprised of the same media. Furthermore, a multiple pocket pocket filter will generally have a lower pressure drop and greater holding capacity than a single pocket pocket filter. A user can utilize this difference in order to expand the life of the filter system and minimize the frequency the filters need to be replaced. The method of using the filter system of this invention utilizes the multiple filter frames 14 to divide the fluid flow area 11 into multiple zones. Each of these zones is defined by the individual filter frame 14. Into each frame 14, or zone, is placed either a planar filter or a pocket filter. In the zones having a planar filter, the pressure drop through that zone will be higher and the fluid flow rate will be lower than in zones having pocket filters. Furthermore, in the zones having pocket filters, the particulate holding capacity will be higher than in the zones having planar filters. In use, the placement of either type of filter can predetermine those zones within the fluid flow area that have higher or lower pressure drops. Also, the placement of either type of filter determines which zone or zones have higher or lower holding capacities. Accordingly, it is possible to vary the filtration capability through the fluid flow area from the maximum pressure drop and minimum holding capacity achieved by the planar filters to the minimum pressure drop and maximum holding capacity achieved by the pocket filters. By choosing different ratios of planar filters to pocket filters, a desired overall pressure drop or overall holding capacity can be engineered for the fluid handling device.

This method can be used in fluid handling devices for hospitals, laboratories, warehouses and any other space which needs to be filtered. As an example that relates to an industrial paint spray booth, the fluid flow area of the booth may be many times greater than the area in which painting actually occurs. In the situation where the type of filter is consistent across the fluid flow area, the filters in the area where the highest concentration of painting takes place will load more quickly than the filters outside the painting area. As a consequence, air flow through the painting area would be reduced to the point where the filters must be replaced, even though the filters outside the painting area do not require replacement. When such a situation arises, a user may insert a pocket filter into the filter frames closest to the painting area and use planar filters in the filter frames of the areas away from the painting area. Therefore, the holding capacity and the fluid flow capability in the painting area are increased such that the time for changing the pocket filters closely corresponds to the time for changing the planar filters. Accordingly, this method of using the aforementioned filter system saves the user time because the time for replacing all of the filters of the fluid handling device closely correspond. Also, the filters are used more efficiently because all the filters are closer to their holding capacity at the time that they require replacement.

Figure 10:
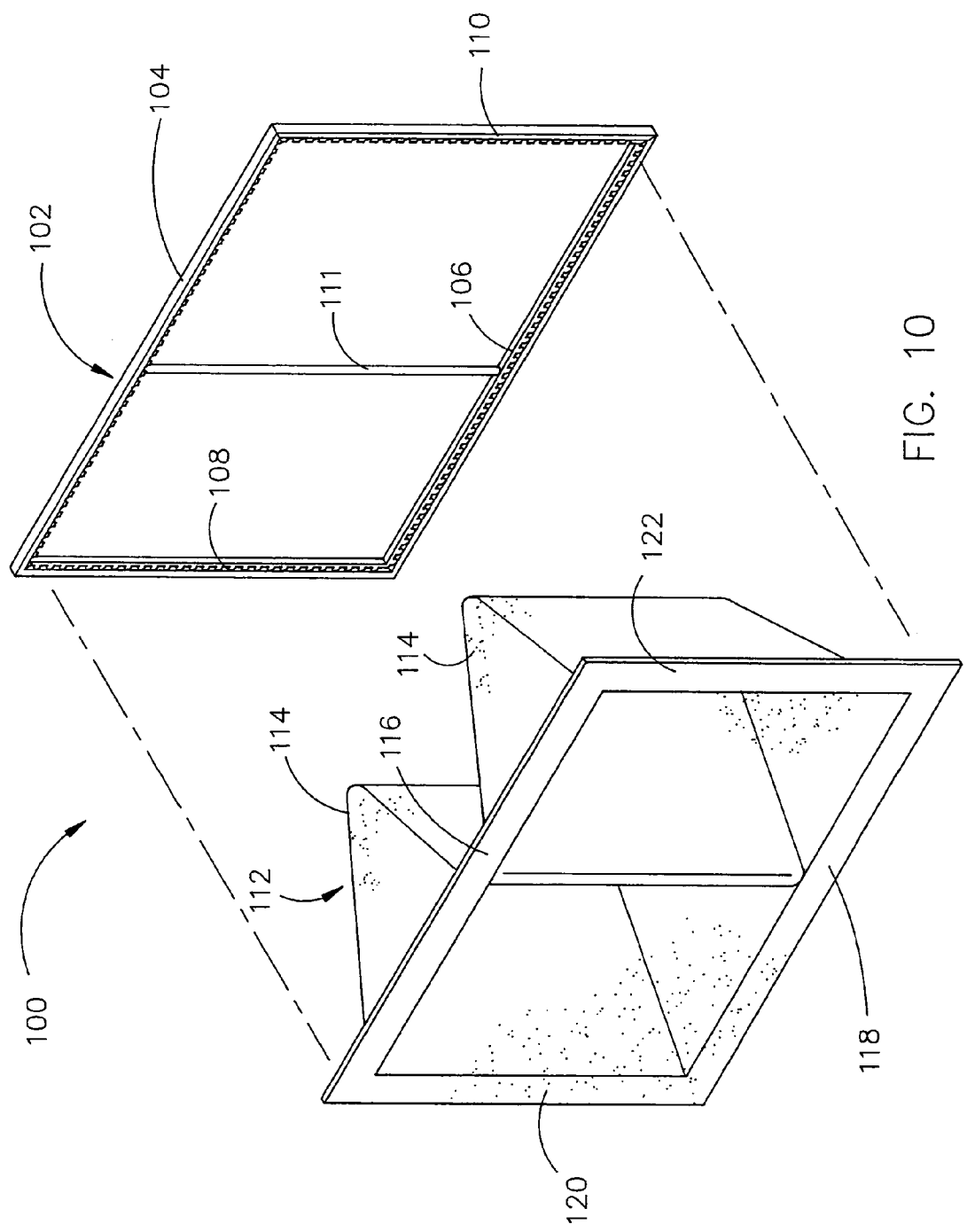
FIG. 10 is an exploded perspective view of a further embodiment.

FIG. 10 illustrates another embodiment of a filter assembly generally referenced by the numeral 100. Filter assembly 100 includes a frame 102 of the type described in U.S. Pat. No. 6,468,324. Frame 102 includes an upper frame member 104, lower frame member 106, first side frame member 108 and second side frame member 110. If desired, frame 102 may include inner frame member 111 for additional support of filter 112. Although it is preferred that the frame 102 is designed as the frame in U.S. Pat. No. 6,468,324, other types of frames could be utilized if the frames include further gripping means.

The numeral 112 refers to a filter of the pocket type including one or more pocket bodies 114 extending in the direction of air flow. The flexible filter 112 includes an upper peripheral section 116, a lower peripheral section 118 and a first peripheral side section 120 and a second peripheral side section 122.

The filter 112 is selectively movably secured to the frame 102 by inserting the sections 116, 118, 120 and 122 into the frame members 104, 106, 108 and 110, respectively, so that the sections are attached or secured to the frame members. When filter 112 needs replacement, the filter 112 is removed from the frame 102 and replaced with a clean filter.

In the same way as described in the earlier embodiments of this invention, filter 112 is easily movable between a collapsed position and a filter position when it is not attached to filter frame 100.

Thus it can be seen that the invention accomplishes at least all of its stated objectives.

I claim:

1. The method of filtering particulate from the fluid flow area of a fluid handling device wherein the concentration of the particulate in the fluid flow area varies from zone to zone therein, comprising the steps of:

positioning one or more planar filters in the zones of the fluid flow area where the concentration of the particulate is low;

positioning one or more pocket filters in the zones of the fluid flow area where the concentration of the particulate is high.

2. The method of claim 1 further comprising monitoring said planar and pocket filters to determine when each filter needs to be replaced.

3. The method of claim 2 further comprised arranging said planar and pocket filters so that each filter needs replacement at generally the same time.

4. The method of claim 1 further comprised arranging said planar and pocket filters so that each filter needs replacement at generally the same time.

5. The method of filtering particulate from the fluid flow area of a fluid handling device wherein the fluid flow area has consistent particulate concentration throughout the fluid flow area that requires filtering of the particulate wherein it is desired to predetermine a filter replacement schedule falling between the minimum replacement schedule established by planar filters and the maximum replacement schedule as established by pocket filters, comprising the steps of:

increasing the number of planar filters in the fluid flow area relative to pocket filters in the fluid flow area to lessen the amount of captured particulate that necessitates filter replacement;

increasing the number of pocket filters in the fluid flow area relative to planar filters in the fluid flow area to increase the amount of captured particulate that necessitates filter replacement.

6. The method of claim 5 further comprising:

monitoring the overall filtered fluid flow area relative to the desired replacement schedule;

increasing the number of pocket filters relative to the number of planar filters if the actual replacement schedule is less than the desired replacement schedule;

increasing the number of planar filters relative to the number of pocket filters if the actual replacement schedule is greater than the desired replacement schedule.

7. The method of claim 5 further comprising:

providing a fluid flow area that requires filtering of a particulate wherein it is desired to predetermine a filter replacement schedule falling between the minimum replacement schedule established by planar filters and the maximum replacement schedule as established by multiple pocket pocket filters;

increasing the number of planar filters relative to multiple pocket pocket filters to lessen the amount of captured particulate that necessitates filter replacement;

increasing the number of multiple pocket pocket filters relative to planar filters to increase the amount of captured particulate that necessitates filter replacement;

exchanging multiple pocket pocket filters for pocket filters having fewer pockets to fractionally change the replacement schedule by a lesser amount than the change that would have occurred if the multiple pocket pocket filter had been exchanged for a planar filter.

8. The method according to claim 5 further including the steps of:

monitoring the pressure drop across the fluid handling device;

increasing the number of high efficiency planar filters to increase the pressure drop;

increasing the number of high efficiency multiple pocket filters to decrease the pressure drop;

and replacing multiple pocket filters with single pocket filters to increase the pressure drop less than the increase that would be obtained by replacing the multiple pocket filter with a planar filter.

9. The method of filtering the fluid flow area of a fluid handling device having a fluid flow area comprised of varying particulate concentration zones requiring predetermined particulate filtration wherein it is desired to vary the fluid flow rate in various zones in the fluid flow area, comprising the steps of:

providing planar filters in those zones requiring lesser flow rates;

providing multiple pocket filters in those zones requiring higher flow rates; and providing single pocket pocket filters in those zones requiring a higher fluid flow rate than is achieved by planar filters and a lower flow rate than is achieved by multiple pocket filters.

* * * * *